March 10, 1931.    E. J. S. SWANSON    1,796,064
CONDUIT FITTING
Filed Aug. 7, 1926
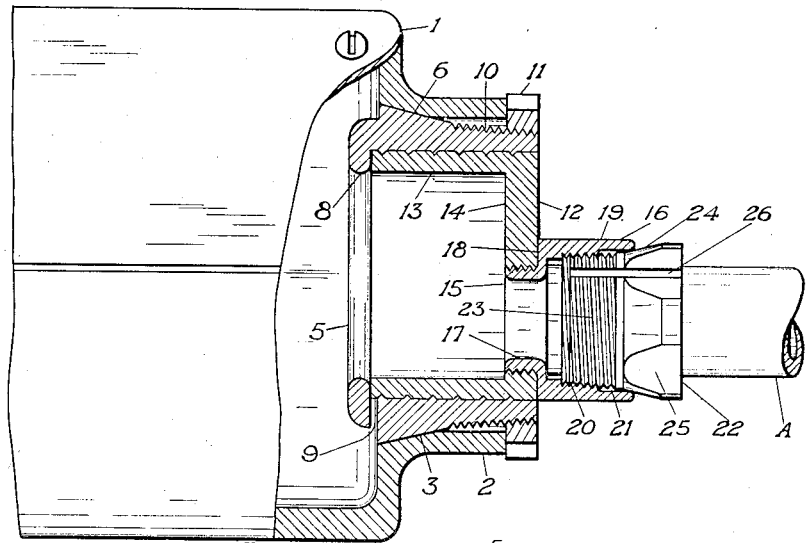
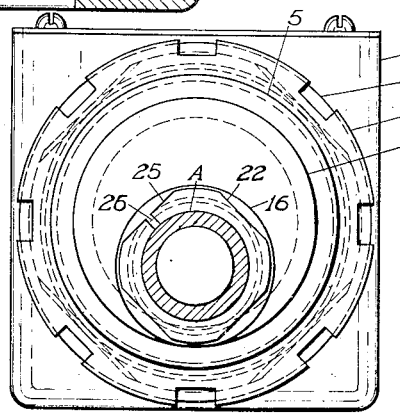
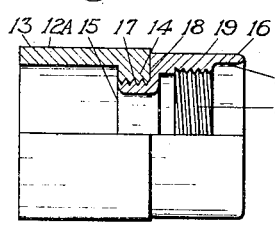 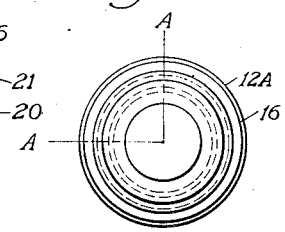 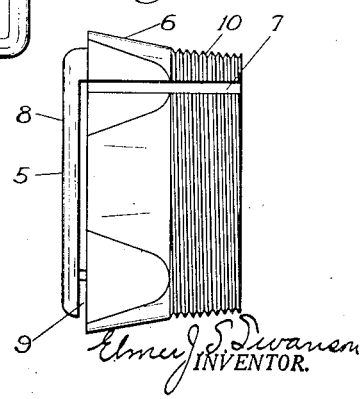
Elmer J. S. Swanson
INVENTOR.
BY
ATTORNEYS.

Patented Mar. 10, 1931

1,796,064

UNITED STATES PATENT OFFICE

ELMER J. S. SWANSON, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed August 7, 1926. Serial No. 127,811.

In the use of conduit fittings it is frequently desirable to reduce the size of the opening in the fitting so as to connect it with a smaller conduit than the opening to the fitting. The present invention is designed to accomplish this purpose with relation to fittings, some features of which are designed for use with threadless conduits. Features and details of the invention will appear from the specification and claims.

The invention is illustrated in the accompanying drawings as follows:—

Fig. 1 shows a side elevation, partly in section, of a conduit fitting.

Fig. 2 an end view of the same.

Fig. 3 an elevation of a contractible sleeve in the fitting.

Fig. 4 a side elevation of an alternative construction partly in section.

Fig. 5 an end view of the construction shown in Fig. 4.

1 marks the conduit fitting which, as shown, is in the form of a conduit box. It will be understood, however, that other specific fittings may be used. The box has a conduit-receiving extension 2 having a tapered opening 3.

A contractible sleeve 5 is arranged in the body extension. This sleeve has a tapered surface 6 adapted to contact with wedging engagement the surfaces 3. The sleeve is provided with a longitudinal slit 7 rendering it contractible and is also provided with an internally extending annular lip 8 at its inner end which is separated from the body of the sleeve by a circumferential slot 9. The outer end of the sleeve 10 is threaded and a nut 11 is adapted to be screwed on the sleeve and against the end of the extension drawing the sleeve into the opening contracting the same and in ordinary practice the sleeve is contracted directly into clamping engagement with an inserted conduit as described in the application of Howard A. Selah, #23,348, filed Apr. 15, 1925, issued as Patent No. 1,683,413, dated Sept. 4, 1928.

A reducing member 12 has an inward projection 13 which is annular and in form similar to a conduit and which is engaged by the contractible sleeve 5 in the same manner as an inserted conduit is clamped. The reducing member has a front wall 14 in which there is a threaded opening 15 which is in form similar to the wall of a knock-out box. It is provided, however, with a threaded opening 15.

A knock-out box fitting 16 has a screw-threaded projection 17 adapted to be screwed into the opening 15, and a shoulder 18 which engages the outer surface of the reducing member. It is provided with an outwardly extending conduit receiving extension 19 having an internally screw-threaded inner portion 20 and an annular unthreaded wedging outer portion 21.

A contractible sleeve 22 has an inner externally threaded portion 23, an intermediate unthreaded portion 24, and an outer wrench-hold portion 25, the screw threads being adapted to screw into the threads 20 and the intermediate portion to be forced into wedging engagement with the portion 21, the wrench-hold permitting the turning of the sleeve into the extension 19. The sleeve is provided with a longitudinal slot 26 permitting the sleeve to readily contract into engagement. It will be noted that the fitting 16 and its contracting sleeve form a standard knock-out fitting as illustrated in the application of Howard A. Selah, #89,042, filed Feb. 18th, 1926.

In Figs. 4 and 5 the reducing member 12a is similar to the reducing member 12 except that the reduction is very much less than that shown in Fig. 1 necessitating a central position of the opening 15.

What I claim as new is:—

1. In a conduit fitting, the combination of a body having a conduit receiving extension; a conduit securing means in the extension comprising a contractible sleeve adapted to engage an inserted conduit; a reducing member clamped in the contractible sleeve; and a threadless conduit securing means on the end of the reducing member.

2. In a conduit fitting, the combination of a conduit-receiving extension; a contractible sleeve in the extension adapted to secure a threadless conduit; a conduit reducing member clamped in the slotted sleeve; a threadless conduit securing means on the reducing member comprising a conduit-receiving extension being internally screw-threaded at its inner end and having an unthreaded outer portion and a contractible sleeve having a screw-threaded end and an unthreaded intermediate portion and outer wrench-hold, the unthreaded portions being in wedging engagement; and a screw connection between the inner end of the means and the reducing member.

3. A conduit fitting having a tubular wall having a threadless cylindrical outer surface adapted to be engaged by a contractible sleeve to secure the same in a conduit fitting, said tubular wall having an end wall with a smaller opening through the end wall and a threadless conduit securing means secured in said opening.

In testimony whereof I have hereunto set my hand.

ELMER J. S. SWANSON.